United States Patent
Lee et al.

(10) Patent No.: US 11,476,019 B2
(45) Date of Patent: *Oct. 18, 2022

(54) COMPOSITION

(71) Applicant: LG Chem, Ltd., Seoul (KR)

(72) Inventors: Jin Kyu Lee, Daejeon (KR); Sang Bum Ahn, Daejeon (KR)

(73) Assignee: LG Chem, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/113,717

(22) Filed: Dec. 7, 2020

(65) Prior Publication Data

US 2021/0098160 A1    Apr. 1, 2021

Related U.S. Application Data

(63) Continuation of application No. 15/762,706, filed as application No. PCT/KR2016/010775 on Sep. 26, 2016, now Pat. No. 10,892,075.

(30) Foreign Application Priority Data

Sep. 25, 2015 (KR) .......................... 10-2015-0136969

(51) Int. Cl.
| | | |
|---|---|---|
| *H01F 1/00* | (2006.01) | |
| *B33Y 50/02* | (2015.01) | |
| *C08L 101/00* | (2006.01) | |
| *B22F 3/105* | (2006.01) | |
| *C08K 5/00* | (2006.01) | |
| *B29C 67/00* | (2017.01) | |
| *H01F 41/02* | (2006.01) | |
| *H01F 1/37* | (2006.01) | |
| *B22F 1/16* | (2022.01) | |
| *C01G 49/02* | (2006.01) | |
| *C08J 5/00* | (2006.01) | |
| *B33Y 10/00* | (2015.01) | |
| *B33Y 70/00* | (2020.01) | |

(52) U.S. Cl.
CPC .............. *H01F 1/0054* (2013.01); *B22F 1/16* (2022.01); *B22F 3/105* (2013.01); *B29C 67/00* (2013.01); *B33Y 50/02* (2014.12); *C01G 49/02* (2013.01); *C08J 5/005* (2013.01); *C08K 5/00* (2013.01); *C08L 101/00* (2013.01); *H01F 1/0063* (2013.01); *H01F 1/37* (2013.01); *H01F 41/02* (2013.01); *B33Y 10/00* (2014.12); *B33Y 70/00* (2014.12); *C01P 2004/62* (2013.01); *C01P 2004/64* (2013.01); *C01P 2006/42* (2013.01); *C08J 2300/24* (2013.01)

(58) Field of Classification Search
CPC ......... H01F 1/0054; H01F 1/0063; H01F 1/37
See application file for complete search history.

(56) References Cited

U.S. PATENT DOCUMENTS

| | | | | |
|---|---|---|---|---|
| 5,334,471 | A | * | 8/1994 | Sacripante .......... G03G 9/0835 430/106.2 |
| 5,971,835 | A | * | 10/1999 | Kordonski ................ B24C 3/18 451/36 |
| 6,210,596 | B1 | | 4/2001 | Takenaka et al. |
| 8,597,534 | B2 | | 12/2013 | An et al. |
| 10,892,075 | B2 | * | 1/2021 | Lee .......................... C08J 5/005 |
| 2003/0144409 | A1 | | 7/2003 | Kassa et al. |
| 2004/0099837 | A1 | | 5/2004 | Kim et al. |
| 2005/0015175 | A1 | | 1/2005 | Huang |
| 2009/0311506 | A1 | | 12/2009 | Herbeck et al. |
| 2011/0024670 | A1 | | 2/2011 | Otsuki et al. |
| 2014/0333405 | A1 | | 11/2014 | Choto et al. |
| 2016/0200011 | A1 | * | 7/2016 | Rothfuss ................. B32B 27/18 264/494 |
| 2016/0200022 | A1 | * | 7/2016 | Takei ...................... B29C 45/82 264/328.1 |
| 2016/0229128 | A1 | | 8/2016 | Dayagi et al. |
| 2018/0261363 | A1 | | 9/2018 | Lee et al. |

FOREIGN PATENT DOCUMENTS

| | | |
|---|---|---|
| CN | 103213281 A | 5/2016 |
| EP | 3292990 A1 | 3/2018 |
| JP | H0649651 A | 2/1994 |
| JP | 2010150441 A | 7/2010 |
| JP | 2017503868 A | 2/2017 |
| KR | 100307486 B1 | 5/2002 |
| KR | 20040043325 A | 5/2004 |
| KR | 20120053920 A | 5/2012 |
| KR | 20140133479 A | 11/2014 |
| WO | 9320993 A1 | 10/1993 |
| WO | 2015120429 A1 | 8/2015 |

OTHER PUBLICATIONS

Chinese Search Report for Application No. CN 201680056053.2 dated Apr. 26, 2019.

(Continued)

*Primary Examiner* — C Melissa Koslow
(74) *Attorney, Agent, or Firm* — Lerner, David, Littenberg, Krumholz & Mentlik, LLP

(57) ABSTRACT

The present application relates to a composition, a 3D printing method using the same, and a three-dimensional shape comprising the same, and provides a composition capable of embodying a precise formation of a three-dimensional shape using a ceramic material and a uniform curing property of the three-dimensional shape.

16 Claims, No Drawings

(56) References Cited

OTHER PUBLICATIONS

Extended European Search Report including Written Opinion for Application No. 16849062.1 dated Nov. 2, 2018.
Search report from International Application No. PCT/KR2016/010775, dated Dec. 23, 2016.
Shao, et al., "Preparation of Fe3O4@SiO2@Layered Double Hydroxide Core-Shell Microspheres for Magnetic Separation of Proteins", Journal of the American Chemical Society, vol. 134, No. 2, Jan. 2012, pp. 1071-1077.
Yunqi Wang et al., "3D Printing of NiZn ferrite/ABS Magnetic Composites for Electromagnetic Devices", Mater. Res. Soc. Symp. Proc. Materials, Jan. 1, 2015, vol. 1788, XP055516410.

\* cited by examiner

COMPOSITION

CROSS-REFERENCE TO RELATED APPLICATIONS

This application is a continuation of U.S. application Ser. No. 15/762,706, filed Mar. 23, 2018, which now issued as U.S. Pat. No. 10,892,075 on Jan. 12, 2021, which is a national phase entry under 35 U.S.C. § 371 of International Application No. PCT/KR2016/010775, filed Sep. 26, 2016, which claims priority to Korean Patent Application No. 10-2015-0136969, filed Sep. 25, 2015, the disclosures of which are incorporated herein by reference.

TECHNICAL FIELD

The present application relates to a composition, a method of 3D printing using the same, and a three-dimensional shape comprising the same.

BACKGROUND ART

The present application relates to a composition which can be applied to the three-dimensional printing. In one embodiment, the three-dimensional printer has a three-dimensional printing mechanism configured to three-dimensionally form a physical object. Researches related to a composition for 3D printing as a three-dimensional printing ink for three-dimensionally forming a physical object by such a three-dimensional printer, have been continuing.

In implementing the desired patterns or solid shapes, conventional 3D printing methods have been carried out by a method of curing a resin composition by heat, light, or the like to form them, or have been used by a method of curing a ceramic particle powder by heat, light, or the like to form ceramic patterns. However, among these methods, the case of the resin composition thermosetting type is a relatively simple manufacturing process in which polymer filaments are thermally melted, extruded and dropped in drops at the designated point to complete a shape of laminating layer by layer, but there are problems such as an imprecise shape and non-uniform curing due to an equipment supplying heat, phase separation between organic/inorganic composite materials and heat shrinkage due to heating/cooling. In addition, the case of the resin composition photocurable type can express precisely, but there are problems such as size of equipment, storage and low hardness after curing. In addition, the curing of the ceramic particle powder has a disadvantage in that a structure is produced by a method of melting and attaching the ceramic powder having a size of several tens of microns or more using high power electron beam or laser and thus it does not have strength and there is a problem that it is difficult to induce the surface gloss of the ceramic.

DISCLOSURE

Technical Problem

The present application relates to a composition used as an ink of a 3D printer, and provides a resin composition for 3D printing capable of precisely forming a three-dimensional solid shape and implementing uniform curing properties of a three-dimensional shape using a ceramic material.

Technical Solution

The present application relates to a composition. The composition can be applied, for example, to printing three-dimensional physical objects. In addition, the composition can be applied to sealing electronic devices. For example, the cured product of the composition can be applied to encapsulating a display device, a microelectronic device, for example, a micro-battery. In the 3D printing method according to the present application, the composition is three-dimensionally applied to form a three-dimensional shape, and heat is generated through magnetic field application, whereby the composition can be uniformly cured.

An exemplary composition may comprise ceramic particles and magnetic particles. The magnetic particles may have two or more magnetic domains (multi-magnetic domains), have irregularly arranged magnetic domains when an external magnetic field is absent, and be magnetized by an external magnetic field. The irregular arrangement of the magnetic domains may mean that magnetic directions existing in the magnetic domains are each different, and in this case, may be a state without magnetism as the net value of the magnetization at room temperature is zero. However, when an external magnetic field is applied, the magnetic directions of the magnetic domains are aligned, whereby the magnetic particles can be magnetized. The magnetic particles may be super-paramagnetic particles, but are not limited thereto. Here, in the composition of the present application, the magnetic particles surround the ceramic particles, or the ceramic particles surround the magnetic particles, whereby magnetic composites may be formed. The structure may be a core-shell structure, but is not limited thereto.

Since the conventional method of melting and attaching the ceramic powder has a large size of the ceramic powder and is bonding between powders, there has been a problem that sites melted and fused by heat correspond to a part of the surface, and thus the strength of the final structure is deteriorated. However, in the composition according to the present application, uniform curing is possible by generating heat from the magnetic material uniformly dispersed in the composition and the strength of the finally cured product can be increased by being accompanied by curing of the ceramic particles. The curing may be performed by sintering between the ceramic materials, without being limited thereto, and the curing of the composition may proceed together with a resin to be described below, and a cross-linked structure may be formed by forming a ceramic sol.

Specifically, the present application generates vibrational heat by magnetization reversal of magnetic particles through electromagnetic induction heating, whereby the generated heat can cure the ceramic material or a thermosetting resin to be described below. In the case of the conventional technique to generate heat by electromagnetic induction, heat is generated by eddy current, where heat was generated by hysteresis loss of a metal or a magnetic material. However, in the case of the present application, as the size of the magnetic particles becomes smaller to be nano-sized, the hysteresis loss becomes smaller and only the saturation magnetization value exists. Therefore, the present application can generate heat due to vibrations between magnetic particles, other than eddy currents. That is, in the present application, the magnetic particles themselves vibrate due to the coercive force of the magnetic particles under an external magnetic field, where the ceramic material or the thermosetting resin can be cured using the generated heat, and the curing proceeds from the inside of the composition, so that it can have excellent physical properties. Accordingly, the present application can realize uniform and stable curing.

As described above, the magnetic particles may comprise two or more magnetic domains. In the present specification, the term "magnetic domain" generally means a region in which magnetization directions are differently divided within a magnetic material. In the present application, magnetic particles having two or more magnetic domains are strongly magnetized by an external alternate-current magnetic field to generate vibrational heat, and when the magnetic field is eliminated, the magnetic particles return to the original magnetic domains, whereby magnetic particles with low residual magnetization of hysteresis loss can be provided.

In an embodiment of the present application, the composition may further comprise second ceramic particles in addition to the ceramic particles described above. The second ceramic particles can be distinguished from the above-mentioned ceramic particles in that they do not form any composite together with the magnetic particles. The second ceramic particles may be mixed with the magnetic composite, and the magnetic composites and the second ceramic particles may be each comprised in a ratio of 1 to 20 parts by weight and 20 to 95 parts by weight; 1 to 15 parts by weight and 30 to 90 parts by weight; 1 to 10 parts by weight and 30 to 85 parts by weight; or 1 to 8 parts by weight and 30 to 80 parts by weight. In the above range of contents, the present application can adjust the viscosity of the 3D printing composition to facilitate application and improve the dispersion characteristics of the particles in the composition.

In this specification, the material of the ceramic particles is not particularly limited, but may comprise at least one oxide, nitride or carbide selected from the group consisting of silicon (Si), aluminum (Al), titanium (Ti) and zirconium (Zr).

In an embodiment of the present application, the average particle size of the ceramic particles may be in a range of 0.1 μm to 5 μm, 0.5 μm to 4 μm or 1 μm to 3.5 μm. However, when the ceramic particles surround the magnetic particles, the average particle size of the ceramic particles may be in a range of 10 nm to 100 nm, 20 nm to 90 nm, or 30 nm to 80 nm. By controlling the particle size of the ceramic particles as described above, the curing can proceed by generating an appropriate range of heat in the composition.

In one example, the magnetic particles may have a coercive force in a range of 1 to 200 kOe, 10 to 150 kOe, 20 to 120 kOe, 30 to 100 kOe, 40 to 95 kOe, or 50 to 95 kOe. The term "coercive force" herein may mean an intensity of the critical magnetic field required to reduce the magnetization of the magnetic material to zero. More specifically, a magnetic material magnetized by an external magnetic field maintains a certain degree of magnetized state even if a magnetic field is removed, where the intensity of a magnetic field capable of making the magnetization degree to zero by applying a reverse magnetic field to the magnetic material thus magnetized is referred to as a coercive force. The coercive force of the magnetic material may be a criterion for distinguishing a soft magnetic material or a hard magnetic material, and the magnetic particles of the present application may be a soft magnetic material. By controlling the coercive force of the magnetic particles in the above range, the present application more easily realizes the magnetization reversal of the magnetic material to generate vibrational heat to a desired degree in the present application, so that it can satisfy a desired degree of curing physical properties by uniform curing of the resin. In one example, the coercive force and saturation magnetization value to be described below may be measured by placing the magnetic particles dried at room temperature in a vibrating sample magnetometer (SQUID-Vibrating Sample Magnetometer, measured by Korea Basic Science Institute) and using an H-S curve (VSM curve) at an external magnetic field of ±1 Tesla.

In one example, for a physical property value measured in the present application, when the measured value is a value varying with temperature, the measured temperature may be room temperature, for example, 25° C.

Furthermore, in one example, the magnetic particle has a saturation magnetization value at 25° C. in a range of 20 to 150 emu/g, 30 to 130 emu/g, 40 to 100 emu/g, 50 to 90 emu/g, or 60 to 85 emu/g. By being capable of controlling the magnetic particles to have a relatively large saturation magnetization value and thus generating heat by vibration between magnetic particles other than eddy currents, the present application can satisfy curing physical properties by uniform curing of the resin. In the present application, the measurement of physical properties of the magnetic particles can be calculated by the value of VSM (Vibrating Sample Magnetometer). The VSM is a device that measures magnetization values of samples by recording the applied magnetic field applied by a Hall probe and recording the electromotive force obtained on applying vibration to the sample by Faraday's law. According to Faraday's law, it can be seen that if the N pole of a bar magnet is directed and pushed towards the coil, the galvanometer moves and the current flows through the coil. The resultant current is called induction current and it is said to have been made by induced electromotive force. The VSM is a method of detecting the induced electromotive force, which occurs on vibrating a sample by such a basic operation principle, in the search coil, to measure the magnetization value of the sample by this electromotive force. The magnetic characteristics of a material can be measured simply as functions of magnetic field, temperature and time, and quick measurement in a magnetic force of up to 2 Tesla and a temperature range of 2 K to 1273 K is possible.

In an embodiment of the present application, the magnetic particles may have an average particle size in a range of 20 nm to 300 nm, 30 nm to 250 nm, 40 nm to 230 nm, or 45 nm to 220 nm. In addition, the magnetic domains in the magnetic particles may have an average size in a range of 10 to 50 nm or 20 to 30 nm. The present application can generate heat capable of performing uniform curing in the composition by controlling the number of magnetic domains and the magnitude of the coercive force of the magnetic particles to an appropriate range in the particle size range. The present application can generate sufficient vibrational heat on curing through a low coercive force and a large number of magnetic domains by controlling the size of the particles to 20 nm or more, and allow only the saturation magnetization value to be present while reducing hysteresis loss of the magnetic material itself, thereby realizing uniform and stable curing by controlling the particle size to 300 nm or less.

If the magnetic particles of the present application can generate heat through electromagnetic induction heating, the material is not particularly limited. In one example, the magnetic particles may satisfy Formula 1 below.

  [Formula 1]

In Formula 1 above, M is a metal or a metal oxide, when M is the metal oxide, |a×c|=|b×d| is satisfied, and when M is the metal, |(1×z)+(a×c)|=|2×b| is satisfied, where X includes Fe, Mn, Co, Ni or Zn, c is the cation charge of X, d is the anion charge of oxygen, and z is the cationic charge of M. In one example, M may be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c may be +3 and d is −2. Also, for example, when $X_aO_b$ is $Fe_3O_4$, it can be expressed as $FeOFe_2O_3$, so that c may be +2 and +3, respectively, and d may be −2. The magnetic particles of the present application are not particularly limited as long as they satisfy Formula 1 above, and may be, for example, $MFe_2O_3$.

In one example, the 3D printing composition of the present application may comprise, as magnetic particles, a compound of Formula 1 above alone, or a mixture of compounds of Formula 1 or a compound doping a compound of Formula 1 with an inorganic substance. The inorganic substance may comprise a monovalent to trivalent cationic metal or an oxide thereof, and two or more of plural cationic metals may be used.

In one example, the magnetic particles may comprise those having surface-treated particle surfaces. That is, the composition of the present application may comprise particles surface-treated with a metal, a metal oxide, an organic substance or an inorganic substance on the surface of the magnetic particles. The present application can prevent the magnetic particles from losing the coercive force of the magnetic material by oxidation in air through the surface treatment. Furthermore, the surface treatment can improve compatibility with the filler, the dispersant organic solvent and the like to be described below, and improve dispersibility of the composition. In one example, the surface treatment can form a polymer of polymethyl methacrylate (PMMA) on the surface by attaching a methyl methacrylate (MMA) monomer to a magnetic particle having a carboxyl group on its surface. In addition, the surface treatment can be carried out by being subjected to an acid treatment to remove the oxide film on the surface, and the surface treatment can also be carried out through a method of coating silica particles.

In an embodiment of the present application, the magnetic composites may form magnetic clusters. By forming the nanoclusters, the nanoparticle-sized magnetic material can prevent agglomeration between the magnetic materials and improve dispersibility, thereby effectively curing the composition by vibrational heat.

In an embodiment of the present application, the composition may form a curable resin composition comprising a curable compound or a ceramic sol.

In one example, the 3D printing composition of the present application may further comprise a curable compound. The curable compound may be a thermosetting resin. The term "thermosetting resin" means a resin that can be cured through application of an appropriate heat or an aging process.

The specific kind of the thermosetting resin in the present application is not particularly limited as long as it has the above-mentioned characteristics. In one example, the thermosetting resin may comprise at least one thermosetting functional group. For example, it may comprise one or more of thermosetting functional groups such as an epoxy group, a glycidyl group, an isocyanate group, a hydroxyl group, a carboxyl group or an amide group, which can be cured to exhibit the adhesive property. In addition, a specific kind of the resin as above may include an acrylic resin, a polyester resin, an isocyanate resin, an ester resin, an imide resin or an epoxy resin, but is not limited thereto.

As the thermosetting resin in the present application, aromatic or aliphatic; or linear or branched epoxy resins may be used. In one embodiment of the present application, an epoxy resin having an epoxy equivalent of 180 g/eq to 1,000 g/eq, which contains two or more functional groups, may be used. By using an epoxy resin having an epoxy equivalent in the above range, properties such as adhesion performance and glass transition temperature of the cured product can be effectively maintained. An example of such an epoxy resin may include one or a mixture of two or more of a cresol novolac epoxy resin, a bisphenol A epoxy resin, a bisphenol A novolak epoxy resin, a phenol novolak epoxy resin, a tetrafunctional epoxy resin, a biphenyl type epoxy resin, a triphenol methane type epoxy resin, an alkyl-modified triphenol methane epoxy resin, a naphthalene-type epoxy resin, a dicyclopentadiene type epoxy resin, or a dicyclopentadiene-modified phenol type epoxy resin.

In the present application, preferably, an epoxy resin containing a cyclic structure in the molecular structure may be used, and more preferably, an epoxy resin containing an aromatic group (e.g., a phenyl group) may be used. When the epoxy resin comprises an aromatic group, the cured product may have excellent thermal and chemical stability. A specific example of the aromatic group-containing epoxy resin that can be used in the present application may be one or a mixture of two or more of a biphenyl type epoxy resin, a dicyclopentadiene type epoxy resin, a naphthalene type epoxy resin, a dicyclopentadiene-modified phenol type epoxy resin, a cresol-based epoxy resin, a bisphenol-based epoxy resin, a xylylol-based epoxy resin, a polyfunctional epoxy resin, a phenol novolac epoxy resin, a triphenol methane type epoxy resin, and an alkyl-modified triphenol methane epoxy resin, and the like, but is not limited thereto.

In an embodiment of the present application, when a thermosetting resin is comprised, the magnetic particles may be comprised in an amount of 0.01 to 25 parts by weight, 0.1 to 20 parts by weight, 1 to 15 parts by weight, 3 to 13 parts by weight, or 5 to 12 parts by weight, relative to 100 parts by weight of the thermosetting resin. In the present specification, unless otherwise specified, the unit "part by weight" means a weight ratio between the respective components. By controlling the content of the magnetic particles in the above weight ratio, the present application can cure the composition through sufficient heat upon 3D printing, and allow the composition to be uniformly cured without phase separation of the composition.

In the above, the composition may further comprise a thermosetting agent. For example, it may further comprise a curing agent capable of reacting with the thermosetting resin to form a cross-linked structure or the like.

A suitable type of the curing agent may be selected and used depending on the type of the functional group contained in the resin.

In one example, when the thermosetting resin is an epoxy resin, as the curing agent, a curing agent of the epoxy resin known in this field, for example, one or two or more of an amine curing agent, an imidazole curing agent, a phenol curing agent, a phosphorus curing agent, or an acid anhydride curing agent may be used, without being limited thereto.

In one example, as the curing agent, an imidazole compound which is solid at room temperature and has a melting point or a decomposition temperature of 80° C. or higher may be used. As this compound, 2-methylimidazole, 2-heptadecylimidazole, 2-phenylimidazole, 2-phenyl-4-methylimidazole or 1-cyanoethyl-2-phenylimidazole, and the like can be exemplified, but is not limited thereto.

The content of the curing agent may be selected depending on composition of the composition, for example, the kind and ratio of the thermosetting resin. For example, the curing agent may be comprised in an amount of 1 to 20 parts by weight, 1 to 10 parts by weight, or 1 to 8 parts by weight, relative to 100 parts by weight of the thermosetting resin.

However, the weight ratio can be changed depending on the kind and ratio of the functional group of the thermosetting resin, the cross-linking density to be implemented, and the like.

In an embodiment of the present application, the 3D printing composition may further comprise a filler. The filler may be an organic filler, an inorganic filler, or a mixture thereof. The specific kind of the filler that can be used in the present application is not particularly limited and for example, one or a mixture of two or more of carbon black, carbon nanotubes, glass fiber, synthetic rubber, $TiO_2$, organic/inorganic pigment, clay, or talc, and the like may be used. The filler may be comprised in an amount of 1 to 100 parts by weight, 10 to 80 parts by weight, or 20 to 60 parts by weight, relative to 100 parts by weight of the thermosetting resin. By using the filler, the present application can ensure the mechanical properties (rigidity, reinforcement) after the composition is cured, and improve dispersibility and bonding property between the nano-sized magnetic material and the organic material.

Furthermore, in one example, the 3D printing composition may further comprise a dispersing agent so that the magnetic particles can be uniformly dispersed. Here, as the usable dispersing agent, for example, a surfactant having an affinity with the surface of the magnetic particle and having good compatibility with the thermosetting resin, such as a nonionic surfactant, can be used. In addition, as the dispersing agent, a dispersing agent of a type containing an acidic or basic group, a high molecular weight acrylic polymer type having a weight average molecular weight of 10,000 or more, an inorganic soda type, or a metal salt type, and the like can be exemplified, and the composition of the present application may comprise one or more dispersing agents. The dispersing agent may be included in an amount of 0.01 to 10 parts by weight, 0.1 to 8 parts by weight, or 0.15 to 5 parts by weight, relative to 100 parts by weight of the solid content in the composition.

The composition according to the present application may comprise various additives depending on applications, the kind of the thermosetting resin, and the 3D printing process described below, in addition to the above-described constitutions, in the range without affecting the above-described effects of invention. For example, the composition may comprise a coupling agent, a cross-linking agent, a curable material, a tackifier, an ultraviolet stabilizer, or an antioxidant in an appropriate amount depending on the desired physical properties. Here, the curable material may mean a material having a thermosetting functional group and/or an active energy ray-curable functional group, which is separately included in addition to the components constituting the above-mentioned composition.

In one example, the composition of the present application may comprise a ceramic sol solvent. The ceramic sol solvent may comprise silica particles to form a silica sol solution, but is not limited thereto. In one example, the ceramic sol may be, for example, in a form that the $SiO_2$ component is dispersed in a content of 10 to 70% by weight in methanol, ethanol, isopropanol or the like, and may serve to improve the hardness of the cured product as prepared. In one example, as the solvent in the present application, water and an organic solvent are used. As the organic solvent, a well-known solvent is used, and an example thereof may include alcohols, aromatic hydrocarbons, ethers, ketones or esters. More specifically, the alcohols may include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol, or the like, the aromatic hydrocarbons may include benzene, toluene, xylene, or the like, the ethers may include tetrahydrofuran, dioxane, or the like, the ketones may include acetone, methyl ethyl ketone, methyl isobutyl ketone, diisobutyl ketone, or the like, and the esters may include ethyl acetate, propyl acetate, butyl acetate, propylene carbonate, methyl lactate, ethyl lactate, normal propyl lactate, isopropyl lactate, methyl 3-ethoxypropionate, ethyl 3-ethoxypropionate, or the like.

In an embodiment of the present application, the sol-gel process means a process of making a colloidal suspension state (sol) and converting this sol into a liquid phase network (gel) through the gelation process of the sol to make an inorganic network. The precursor for synthesizing the colloid is composed of a material in which metal or metalloid elements are surrounded by various reactive ligands. For example, metal alkoxides are most commonly used, because these materials readily react with water. As the most widely used metal alkoxide, alkoxysilane, that is, tetramethoxysilane (TMOS) and tetraethoxysilane (TEOS) can be exemplified. In one example, the material used as the Si source may include sodium silicate, tetraethyl orthosilicate or sodium meta-silicate.

In an embodiment of the present application, the 3D printing composition may further comprise a resin soluble in a water-based or alcohol phase. The resin may have, for example, a solubility of 1 to 50 parts by weight, 10 to 40 parts by weight, or 20 to 30 parts by weight at a temperature of 25° C. with respect to 100 parts by weight of water or ethanol. The type of the resin is not particularly limited and may include polyethylene glycol or polydimethylsilane, and include one that the terminal of the resin is a hydroxyl group, H, an alkoxy group, or hyrolyl acid. In addition, as the resin, for example, a silicone-based polymer, a cellulose-based resin, or an acrylic-based resin may be used without limitation. By comprising the soluble resin, the present application can adjust the viscosity of the 3D printing composition, thereby realizing excellent application characteristics in the printing process.

Furthermore, in an embodiment of the present application, the 3D printing composition may further comprise a thermal acid initiator or a thermal base initiator. The thermal acid initiator and the thermal base initiator may be appropriately selected from known materials within the scope of the present application. For example, the thermal base initiator may include an ammonium salt, and the thermal acid initiator may include a sulfonate. The present application can further improve, for example, the sol-gel reactivity of the silane in the ceramic sol solution by further comprising a thermal acid initiator or a thermal base initiator. Specifically, the silane derivative may be subjected to a silica sol-gel reaction through hydrolysis and condensation reaction by an acid or a base to form a silica network (cross-linked structure).

The present application also relates to a 3D printing method. An exemplary 3D printing method may comprise a step of sterically applying the above-described composition to form a three-dimensional shape. The 3D printing method according to the present application sterically applies the composition to form a three-dimensional shape, and then generates vibrational heat from the magnetic particles through a magnetic field application step, whereby the composition can be uniformly cured.

The step of applying a magnetic field is not particularly limited and can be performed with a known method by those skilled in the art. For example, the step of applying a magnetic field may be performed by applying a magnetic field with a current of 50 A to 500 A, 80 A to 450 A, or 120 A to 430 A for 20 seconds to 60 minutes, 30 seconds to 30 minutes, or 30 seconds to 200 seconds, at a frequency of 100 kHz to 1 GHz.

In one example, the step of applying a magnetic field may comprise at least two steps of multi-profile methods. The multi-profile method may be performed at a frequency of 100 kHz to 1 GHz. Specifically, the multi-profile method may comprise a first step of applying a magnetic field with a current of 10 A to 80 A for 20 seconds to 10 minutes, a second step of applying a magnetic field with a current of 80 A to 130 A for 20 seconds to 10 minutes and a third step of applying a magnetic field with a current of 150 A to 500 A for 5 seconds to 5 minutes.

In addition, the step of applying a magnetic field may also proceed in a manner that gives a gradient difference of the profile. For example, in the case of the multi-profile method, it is a method of applying the magnetic field by controlling the intensity of the magnetic field stepwise, but the method of giving a gradient difference is a method of sequentially raising the magnetic field with 100 to 200 A at an interval, which can block rapid exotherm and prevent characteristic deterioration of the cured product to cause thermal degradation depending on characteristics of the resin to be cured upon rapidly applying heat.

On the other hand, the thermosetting can proceed with application of the magnetic field as described above, and may comprise additionally applying heat at 40° C. to 100° C. for 1 to 24 hours, after applying the magnetic field. Furthermore, without being limited to the above, it is possible to apply heat together with applying the magnetic field.

The present application also relates to a three-dimensional solid shape. The solid shape may comprise a cured product of the above-described composition.

The present application also relates to a microelectronic device. An exemplary microelectronic device may comprise a cured product comprising the above-described composition. The cured product may be applied as a sealing material, but is not limited thereto. For example, the microelectronic device may include a micro battery, a biosensor, an actuator, or the like. In addition, the present application can provide a display device using the above-described composition as a sealing material or the like.

Advantageous Effects

The present application provides a composition capable of precisely forming a three-dimensional solid shape and implementing uniform curing properties of a three-dimensional shape using a ceramic material.

BEST MODE

Hereinafter, the present invention will be described in more detail with reference to Example complying with the present invention and Comparative Examples not complying with the present invention, but the scope of the present invention is not limited by the following examples.

Example 1

A silica sol gel solution was prepared, which comprises 1 g of nanomagnetic composites having a structure in which the surfaces of $FeOFe_2O_3$ particles (Multi-Magnetic Domains, average particle size about 100 nm: measured by Field Emission Scanning Electron Microscope (using DLS)), which are a soft magnetic material (Soft Type), as magnetic particles, were surface-treated with $SiO_2$ (particle size about 10 nm) as ceramic particles in a thickness of 10 nm, 10 g of alumina particles having a particle size of about 1 to 3 μm, 2 g of zirconium particles, 5 g of silica particles, 4.5 g of sodium silicate, 14 g of water and 0.2 g of a thermal acid generator (TAG2678).

Immediately after laminating the composition on a support through a nozzle in a feeding device, a magnetic field was applied thereto at a current value of 300 A for 5 minutes in an external alternate-current magnetic field generator. The magnetic field was applied by introducing the composition into a sample vial in a solenoid coil (3 turns, OD 50 mm, ID 35 mm) and adjusting the current value and time of the magnetic field generator (Easyheat from Ambrell). The composition was thermally cured with vibrational heat generated through application of the magnetic field to form a pattern or a three-dimensional shape.

Example 2

A composition was prepared in the same manner as in Example 1, except that 6 g of tetraethyl orthosilicate was added thereto instead of sodium silicate, and allowed to form a pattern or a three-dimensional shape.

Example 3

A composition was prepared in the same manner as in Example 1, except that 5 g of sodium meta-silicate was added thereto instead of sodium silicate, and allowed to form a pattern or a three-dimensional shape.

Example 4

A composition was prepared in the same manner as in Example 1, except that an ammonium salt derivative as a thermal base generator was added thereto instead of the thermal acid generator, and allowed to form a pattern or a three-dimensional shape.

Example 5

A composition was prepared in the same manner as in Example 2, except that an ammonium salt derivative as a thermal base generator was added thereto instead of the thermal acid generator, and allowed to form a pattern or a three-dimensional shape.

Comparative Example 1

A composition was prepared in the same manner as in Example 1, except that $FeOFe_2O_3$ particles (Single-Magnetic Domain, average particle size about 100 nm), which are a ferromagnetic material (Hard Type), as magnetic particles, were used, and allowed to form a pattern or a three-dimensional shape.

Experimental Example 1—Measurement of Cure Degree (Visual, Touch)

After curing the composition, it was confirmed whether the cured product had flowed when it was turned over after cooling, and then the curing was confirmed by checking the degree of pressing of the cured product with a metal spatula. In the above, it can be confirmed that when there is flowability and the cured product is pressed, the composition has been not cured.

TABLE 1

|  | Measurement of Cure Degree |
|---|---|
| Example 1 | Cured |
| Example 2 | Cured |
| Example 3 | Cured |
| Example 4 | Cured |
| Example 5 | Cured |
| Comparative Example 1 | Non-cured |

The invention claimed is:

1. A composition comprising ceramic particles, and magnetic particles having at least two magnetic domains, wherein the magnetic domains are irregularly arranged when an external magnetic field is absent and are magnetized by an external magnetic field, wherein the magnetic particles comprise those having surface-treated particle surfaces, and wherein the magnetic particles have a coercive force in a range of 1 to 200 kOe,
wherein the magnetic particles surround the ceramic particles, or the ceramic particles surround the magnetic particles, whereby magnetic composites are formed,
wherein the composition further comprising second ceramic particles,
wherein the magnetic composites and the second ceramic particles are each comprised in a ratio of 1 to 20 parts by weight and 20 to 95 parts by weight.

2. The composition according to claim 1, wherein the ceramic particles comprise at least one oxide, nitride or carbide selected from the group consisting of silicon (Si), aluminum (Al), titanium (Ti) and zirconium (Zr).

3. The composition according to claim 1, wherein the ceramic particles have an average particle size in a range of 0.1 μm to 5 μm.

4. The composition according to claim 1, wherein the magnetic particles have a saturation magnetization value at 25° C. in a range of 20 to 150 emu/g.

5. The composition according to claim 1, wherein the magnetic particles have an average particle size in a range of 20 to 300 nm.

6. The composition according to claim 1, wherein the magnetic domains have an average size in a range of 10 to 50 nm.

7. The composition according to claim 1, wherein the magnetic particles satisfy Formula 1 below:

$$MX_aO_b \quad \text{[Formula 1]}$$

wherein, M is a metal or a metal oxide,
when M is the metal oxide, $|a \times c| = |b \times d|$ is satisfied, and
when M is the metal, $|(1 \times z) + (a \times c)| = |2 \times b|$ is satisfied,
where X includes Fe, Mn, Co, Ni or Zn, c is the cation charge of X, and d is the anion charge of oxygen, and z is the cationic charge of M.

8. The composition according to claim 1, wherein the magnetic particles are vibrated by magnetization reversal.

9. The composition according to claim 1, further comprising a thermosetting resin.

10. The composition according to claim 1, further comprising a thermosetting agent.

11. The composition according to claim 1, further comprising a resin soluble in a water-based or alcohol phase.

12. The composition according to claim 1, further comprising a thermal acid generator or a thermal base generator.

13. A 3D printing method comprising applying the composition of claim 1 to form a three-dimensional shape.

14. The 3D printing method according to claim 13, further comprising applying a magnetic field to the applied composition.

15. The 3D printing method according to claim 14, wherein the applying a magnetic field comprises at least two steps of multi-profile methods.

16. A three-dimensional shape comprising a cured product of the composition of claim 9.

* * * * *